United States Patent [19]

Grass

[11] Patent Number: 4,671,716
[45] Date of Patent: Jun. 9, 1987

[54] LOCKING SCREW FOR THE ADJUSTABLE CONNECTION OF A HINGE STRAP

[75] Inventor: Alfred Grass, Höchst, Austria

[73] Assignee: Alfred Grass GmbH Metallwarenfabrik, Höchst, Austria

[21] Appl. No.: 848,685

[22] Filed: Apr. 4, 1986

[30] Foreign Application Priority Data

Apr. 11, 1985 [DE] Fed. Rep. of Germany ....... 3512888

[51] Int. Cl.[4] .................. F16B 39/24; F16B 39/26
[52] U.S. Cl. .................... 411/156; 411/261; 411/301; 411/314; 411/533; 411/544; 411/959; 411/393
[58] Field of Search ............. 411/132, 147, 148, 155, 411/156, 269, 261, 301, 305, 306, 313, 314, 324, 325, 393, 533, 544, 956, 959

[56] References Cited

U.S. PATENT DOCUMENTS

| | | | |
|---|---|---|---|
| 1,330,792 | 2/1920 | Frick | 411/959 X |
| 1,784,377 | 12/1930 | Moore | 411/393 |
| 1,945,005 | 1/1934 | Vacher | 411/155 X |
| 2,987,091 | 6/1961 | Cartlidge | 411/393 |
| 3,501,993 | 3/1970 | Swenson | 411/393 |

FOREIGN PATENT DOCUMENTS

| | | | |
|---|---|---|---|
| 173712 | 1/1922 | United Kingdom | 411/393 |
| 662144 | 12/1951 | United Kingdom | 411/393 |
| 1127593 | 5/1965 | United Kingdom | 411/306 |
| 734442 | 5/1980 | U.S.S.R. | 411/314 |

*Primary Examiner*—Thomas J. Holko
*Attorney, Agent, or Firm*—Brown, Martin, Haller & Meador

[57] ABSTRACT

The locking screw for the adjustable connection of a hinge strap to a base plate of a hinge has an external thread, with which the locking screw is screwed into a corresponding threaded hole in the hinge flap. The end face of the bolt portion of the locking screw abuts on the corresponding face of the base plate. In order to ensure a secure seating of the locking screw even under changing loads, a plate spring is attached to the end face of the locking screw and is spring-loaded axially, which abuts the base plate with its spring front face.

14 Claims, 2 Drawing Figures

LOCKING SCREW FOR THE ADJUSTABLE CONNECTION OF A HINGE STRAP

BACKGROUND OF THE INVENTION

The invention concerns a locking screw according to the preamble of patent claim 1. Such a locking screw is known for example under DE-PS No. 27 26 671 from the same applicant, and is, after all, a commonly used locking method for the adjustable connection of a hinge strap to a base plate. In order to ensure a strong contact and a strong support between the locking screw and the assembly plate, a sharp edged ridge is formed on the end face of the threaded portion of the screw which is designed to cut into the material of the assembly plate thus achieving a stronger seating.

Because the material of the assembly plate is relatively soft and because of the varying loads on the hinge, the ridge on the screw digs into the plate, cratering it, and thus the screw loosens and has to be retightened after the hinge has been used for some time. In extreme cases, the hinge can come right off the assembly plate because of the loosened screw.

BRIEF SUMMARY OF THE INVENTION

The invention is based on the problem of developing a locking screw of the type mentioned in the introduction in such a way as to achieve a stronger seating on the assembly plate even when many changes of loading are applied to the hinge.

To solve the problem, the invention is characterized in that on the end face of the locking screw a plate spring is attached which is spring-loaded axially and which abuts the base plate with its spring front face.

It is fundamental, therefore, that on the end face of the locking screw, a plate spring is arranged preferably with a sharp edge on its circumference, which abuts the corresponding face of the base plate and cuts into the material of the base plate.

Because the plate spring is formed to be axially spring-loaded, it creates a permanent axial preload for the locking screw which is thus pressed against the assembly plate in a force-locking fashion under the influence of this preloading. Even a slow digging-in of the sharp edge of the plate spring into the material of the assembly plate does not alter the firm seating of the locking screw in that the ensuing axial displacement is equalized by the axial resilience of the plate spring.

Further developments of the subject of claim 1 are the subjects of the remaining subclaims.

The subject of the present invention arises not only from the subject of the individual patent claims but also from the combination of the individual claims, one with another.

All the details and features disclosed in the documents, particularly those arising from the drawings illustrating the layout are claimed as being essential to the invention, insofar as they are new, either individually or in combination, as compared to the state of the art.

In the following, the invention will be further explained by means of drawings illustrating merely one embodiment example. Here arise from the drawings and their description further features and advantages essential to the invention.

DETAILED DESCRIPTION

Figure 1:
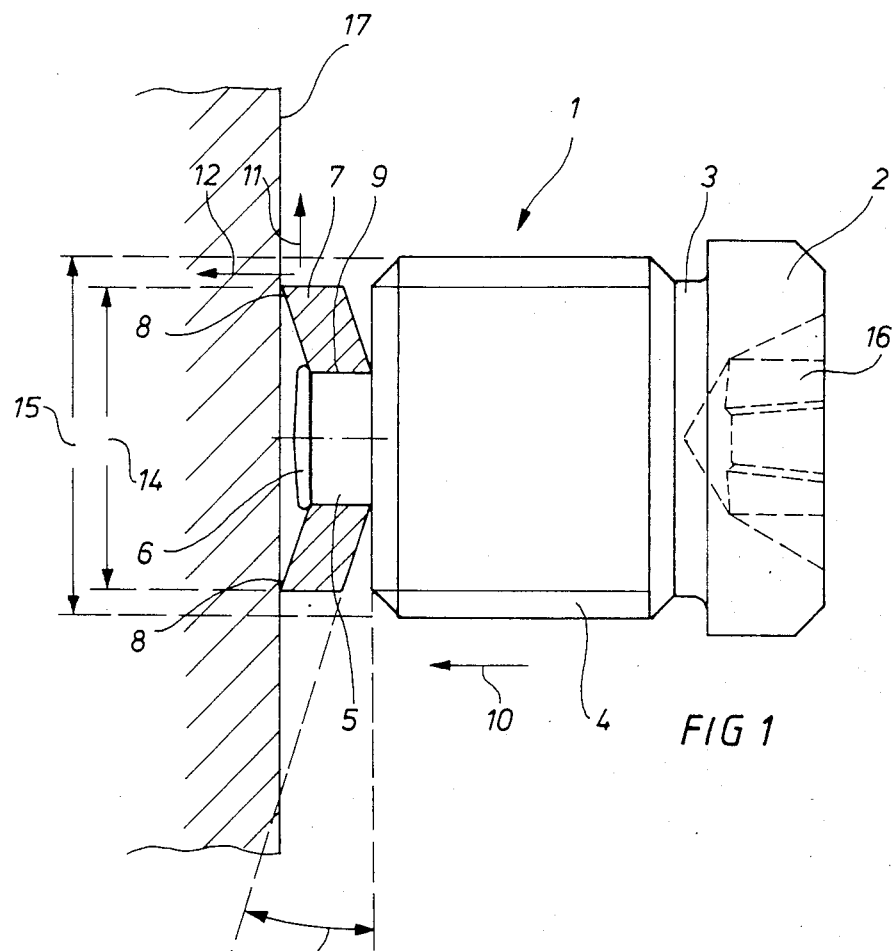
FIG. 1 is a schematic cross-section through a locking screw according to the invention.

The locking screw (1) has, in the known fashion, a head (2) with a hexagonal recess (16) which can also be formed as a straight slot screw head or as a cross-slotted head (e.g. Phillips).

The head (2) has a waisted portion (3) which opens out to the external thread (4) with which the locking screw (1) is screwed into a threaded hole (not illustrated) in the plate of a double-joint hinge (not illustrated).

On the end face of the locking screw (1), a pin (5) is formed which, in a first embodiment example, is from the same material as the locking screw (1) and could be achieved, for example, by a rolling procedure by which the thread of the locking screw (1) is rolled and, simultaneously the waisted portion (3) and the pin (5) are also rolled on. The pin (5) could also be formed as a pressed or turned piece.

A two-piece embodiment example of the present invention makes provision for the pin (5) to be riveted into the locking screw (1) or screwed into it by the usually known method of connection (e.g. external and internal threads).

The end face of the pin (5) has a rivet head (6) of enlarged diameter in which the pin (5) fits through a corresponding hole (9) in a plate spring (7). The rivet head (6), or enlarged diameter, thus retains the plate spring (7) firmly in position on the pin (5).

It is important that the plate spring is, in profile, inclined downward at the angle (13) in order to ensure that, when the locking screw (1) is moved towards the base plate (17) in the direction of arrow (10) the plate spring can spring back and thus the sharp edges (8) move on the surface of the base plate (17) in the direction of arrows (11) and (12) and works itself into it.

Because of the great resilience of the plate spring, a force-locking positioning of the locking screw (1) on the surface of the base plate (17) is always ensured, even when the edge (8) works itself into the material of the base plate (17).

Further, it is also important that the diameter (14) of the plate spring (7) is smaller than the root diameter of the thread (4) in order to ensure that the locking screw (1) can be screwed through the required hole unhindered by the plate spring (7).

Figure 2:
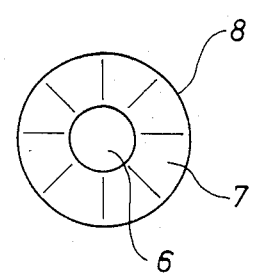
FIG. 2 is a plan view of the front face of the plate spring.

The plate spring is of a circular shape in plan view in a preferred embodiment example (FIG. 2).

A further embodiment example could, however, incorporate a rectangular or square form of such a plate spring.

The plate spring (7) consists of a hardened spring-steel material and can, to vary the resilience, have radial slits as shown by lines in FIG. 2.

The rotatable mounting on the plate spring on the attachment screw has the advantage in that the plate spring, because of its axial clearance, can adapt to an uneven surface of the assembly plate and also the turning of the locking screw is made easy, enabling higher torque loads to be applied. Additionally, a possible tumbler movement or action of the shaft of the locking screw, in the case of a movement of this screw, is centralized by the plate screw dug into the assembly plate and does not lead to a sliding of the plate spring on the assembly plate.

What I claim is:

1. A locking screw having an externally-threaded portion with an end face for the adjustable connection of a hinge strap to a base plate of a hinge in which the locking screw is screwed into a corresponding threaded hole in a hinge strap by said externally-threaded portion and the end face abuts a corresponding surface of the base plate, characterized in that: a conical plate spring separate from said threaded portion is disposed on said end face, said plate spring having a front face oriented to abut and axially spring-load against said base plate surface.

2. The locking screw according to claim 1, further characterized in that said front face of the sprung part of the plate spring (7) is formed as a sharp edge (8).

3. The locking screw according to claim 1, further characterized in that said plate spring (7) is fitted to said end face by a stationary rivet connection (6,5).

4. The locking screw according to claim 3, further characterized in that said rivet connection (6,5) is formed in one stationary piece with the locking screw (1).

5. The locking screw according to claim 1, further characterized in that said plate spring (7) is rotatably mounted in the locking screw (1).

6. The locking screw according to claim 1, further characterized in that said plate spring (7) is circular in shape and the outer diameter (14) of said plate spring is smaller than the root diameter (15) of said threaded portion.

7. In a locking screw having an externally-threaded portion with an end face for the adjustable connection of a hinge strap to a base plate of a hinge in which the locking screw is screwed into a corresponding threaded hole in a hinge strap by its externally-threaded portion and said end face abuts a corresponding surface of the base plate, the improvement comprising: a pin (5) on said end face having a rivet head (6) with a conical plate spring (7) riveted there between, said plate spring extending above said rivet head.

8. The locking screw of claim 7, further characterized in that said plate spring includes a frontal face having a sharp edge.

9. The locking screw of claim 7, further characterized in that said plate spring is rotatably mounted on said pin.

10. The locking screw of claim 7, further characterized in that said plate spring is substantially circular in shape and has an outer diameter smaller than the root diameter of said threaded portion.

11. In a locking screw with an externally-threaded extension having an end face, the improvement comprising:
   a stationary pin attached at said end face and having a diameter which is less than the root diameter of said externally-threaded portion;
   a conical plate spring, separate from said locking screw, abutting said end face, and rotatably mounted on said pin; and
   retaining means for keeping said conical plate spring on said pin.

12. The improvement of claim 11 wherein said conical plate is substantially circular and has a diameter less than said root diameter but greater than the diameter of said pin.

13. The improvement of claim 12 wherein said conical plate spring has a front face including a sharpened edge.

14. The improvement of claim 11 wherein said conical plate spring has a front face including a sharpened edge.

* * * * *